Patented Aug. 12, 1952

2,606,878

UNITED STATES PATENT OFFICE 2,606,878

DOUBLE-CALCINATION PROCESS OF PREPARING AN ALUMINA-PLATINUM-HALOGEN CATALYST

Vladimir Haensel, Hinsdale, Ill., assignor to Universal Oil Products Company, Chicago, Ill., a corporation of Delaware No Drawing. Application June 28, 1949,
Serial No. 101,903

6 Claims. (Cl. 252—442)

This application is a continuation-in-part of my copending application Serial No. 788,672 filed November 28, 1947, now U. S. Patent No. 2,479,109.

This invention relates to the manufacture of catalysts and particularly to the manufacture of platinum containing catalysts. In another embodiment the present invention relates to the use of these catalysts in the conversion of hydrocarbons and particularly in the reforming of gasoline.

Platinum-containing catalysts and various methods of manufacturing the same heretofore have been suggested. These catalysts have been of limited commercial acceptance because of the high cost thereof. The present invention is based on the discovery that exceptionally good catalysts may be prepared by specific methods of preparation to be hereinafter described in detail.

In one embodiment the present invention relates to a method of preparing a catalyst which comprises commingling platinum with alumina, thereafter compositing a halogen, and heating the composite.

In another embodiment the present invention relates to a method of preparing a catalyst which comprises forming a mixture of alumina and platinum, thereafter compositing therewith halogen in an amount of from about 0.2 to about 8% by weight, and heating the composite.

In a specific embodiment the present invention relates to a method of preparing a catalyst which comprises precipitating alumina from aluminum chloride, commingling a platinum-containing solution therewith, thereafter combining hydrogen fluoride therewith in an amount of fluorine of from about 0.1% to about 3% by weight of said alumina, and thereafter heating the composite to a temperature of from about 700° to about 1100° F.

In another specific embodiment the present invention relates to a method of preparing a catalyst which comprises adding a basic precipitant to aluminum chloride to form alumina, adding hydrogen sulfide to a chloroplatinic acid solution and commingling the resultant solution with alumina, drying the mixture and calcining at a temperature of from about 700° to about 1100° F., thereafter commingling hydrogen fluoride solution in an amount to form a final catalyst containing from about 0.1% to about 3% by weight of fluorine, and subsequently heating the composite at a temperature of from about 700° to about 1100° F.

In still another specific embodiment the present invention relates to a method of preparing a catalyst which comprises adding a basic precipitant to aluminum chloride to form alumina, washing to remove soluble impurities, calcining at a temperature of from about 800° to about 1400° F., commingling therewith a platinum containing solution in an amount to form a final catalyst containing from about 0.01% to about 1% by weight of platinum, thereafter commingling hydrogen fluoride solution in an amount to form a final catalyst containing from about 0.1% to about 3% by weight of fluorine, and heating the composite at a temperature of from about 700° to about 1100° F.

In still another embodiment the present invention relates to the use of catalysts prepared in the manner herein set forth for the conversion of hydrocarbons including the reforming of gasoline to improve its antiknock characteristics.

It has been found that exceptionally good catalysts are prepared in accordance with the novel features of the present invention. While these catalysts may contain larger concentrations of platinum, which may range up to about 10% by weight or more of the alumina, it has been found that exceptionally good catalysts may be prepared to contain as low as from about 0.01% to about 1% by weight of platinum. Catalysts of these low platinum concentrations are particularly preferred in the present invention because of the considerably lower cost of the catalyst. It is well known that platinum is very expensive and any satisfactory method of reducing the amount of platinum required in catalysts considerably reduces the cost of the catalyst and thus enhances the attractiveness of the catalyst for use in commercial processes. The platinum generally comprises a major portion of the cost of the catalyst and, therefore, by reducing the amount of platinum required to one half, for example, reduces the cost of the catalyst substantially by one half. Further, for example, when the amount of platinum is reduced to about 0.1% by weight as against 5% by weight, or more, as heretofore required, it is readily apparent that the cost of the catalyst is reduced by at least 50 times.

However, in order to obtain improved results with these low platinum concentrations, it is necessary that a particular type of supporting component must be composited with the platinum. It has been found that alumina shows unexpected advantages for use as a supporting component for the low platinum concentrations, apparently due to some peculiar association of the alumina with the platinum, either as a chemical combination or as a physical association. It has been found that the specific combination of alumina and low platinum concentration is not only a very active catalyst, but also has a long catalyst life; that is, the catalyst retains its high activity for long periods of service. After these long periods of service, the catalyst may show a drop in activity and it has further been found that the particular combination of alumina and platinum renders the catalyst susceptible to ready regeneration.

To further improve these catalysts, it is an essential feature of the present invention that the final catalyst contains halogen in a specific concentration. It has been found that the presence of halogen within a specific range enhances the activity of the catalyst. It is believed that the halogen enters into a chemical combination or loose complex with the alumina and/or platinum, and thereby serves to improve the final catalyst.

While any of the halogen ions will serve to effect improved results, the fluoride ions are preferred. Next in order are the chloride ions, while the bromide and iodide ions are generally less preferred. It is understood that, while all of these halogens will serve to effect an improvement, they are not necessarily equivalent.

The catalyst of the present invention may be prepared in any suitable manner, a particularly preferred method is to prepare alumina by adding a suitable reagent, such as ammonium hydroxide, ammonium carbonate, etc. to a salt of aluminum, such as aluminum chloride, aluminum sulfate, aluminum nitrate, etc. in an amount to form aluminum hydroxide which upon drying is converted to alumina and, in the interest of simplicity, the aluminum hydroxide is referred to as alumina in the present specification and claims in order that the percentages are based on alumina free of combined water. It has been found that aluminum chloride is generally preferred as the aluminum salt, not only for convenience in subsequent washing and filtering procedures, but also because it appears to give best results. Another suitable method is to react sodium aluminate with aluminum chloride or other suitable aluminum salt in order to prepare the alumina.

After the alumina has been formed, it is generally washed to remove soluble impurities. Usual washing procedures comprise washing with water, either in combination with filtration or as separate steps. It has been found that filtration of the alumina is improved when the wash water includes a small amount of ammonium hydroxide. The washing should be of sufficient severity to substantially completely remove all soluble impurities because it has been found that the presence of impurities may have a deleterious effect on the activity of the catalyst. A particularly preferred method is to utilize pure aluminum chloride in the preparation of the alumina and likewise to use purified water and other reagents in preparing the catalyst so as not to introduce impurities into the catalyst from these sources.

In some cases, it may be desired to commingle an organic acid and particularly acetic acid which has been found to have a favorable effect on the catalyst. The acetic acid apparently serves to peptize the alumina and thereby to render it in a better condition for compositing with the platinum, and also partly to fix the platinum on the alumina so that migration of the platinum during subsequent heating is minimized. The amount of acetic acid, when employed, will generally be within the range of from about 0.05 to about 0.5 mol of acetic acid per mol of alumina.

Alumina prepared in the above manner, after washing and filtration is generally recovered as a wet cake. In one embodiment of the invention the wet cake, either with or without being made into a slurry with water, is commingled with a suitable platinum containing solution in order to composite the platinum with the alumina. Chloroplatinic acid solution is preferred because of its ready availability. However, any suitable platinum solution may be used, including solutions of tetraamino platino chloride, ammonium platino-nitrite, dinitro-diamino-platinum, etc. These compounds are soluble in cold aqueous solutions and, therefore, are readily usable. Other platinum compounds are soluble in hot water and therefore can be used by heating the solution and using the hot solution to obtain the desired commingling with the alumina. Still other platinum compounds may be insoluble in water but are soluble in other solvents such as ketones, ethers, etc. and, when these compounds are used, it will be necessary to employ a suitable solvent.

The platinum preferably is added in a manner to obtain a uniform distribution throughout the alumina. When the platinum is added to the wet alumina, a particularly preferred method is to form a separate solution of chloroplatinic acid in water and introduce hydrogen sulfide into this solution at room temperature, until the chloroplatinic acid solution reaches a constant coloration; that is, will not change color upon the addition of more hydrogen sulfide. The chloroplatinic acid solution is normally light yellow and, upon addition of hydrogen sulfide gas, turns to a dark brown color. Apparently the chloroplatinic acid and hydrogen sulfide react to form one or more complex chemical compounds. In another method of preparation the chloroplatinic acid may be added to the slurry of alumina gel, and hydrogen sulfide then is added to the mixture.

In some cases, satisfactory catalyst may be produced by commingling the chloroplatinic acid solution with the slurry of alumina gel, and then drying and heating in the manner hereinafter set forth. In this method, hydrogen sulfide is not used. However, experiments have shown that the hydrogen sulfide addition is preferable because it tends to further fix the platinum in the form of an insoluble compound on the alumina so that the platinum compound will not migrate during the subsequent heating of the catalyst.

In another embodiment of the invention the alumina may be formed into particles and calcined prior to commingling the platinum solution therewith. In this embodiment of the invention the wet filter cake is dried at a temperature of from about 200° to 500° F. or more for a period of from about 2 to 24 hours or more. The dried material is then ground and, when particles of irregular size and shape are desired, the ground material may be calcined at a temperature of from about 800° to about 1400° F. for a period of from about 2 to 12 hours or more. When particles of uniform size and shape are desired, a suitable lubricant such as stearic acid, rosin, hydrogenated coconut oil, graphite, etc. is added and the alumina is formed into pills in any suitable pelleting apparatus. Particularly satisfactory pills comprise those of a size ranging from about 1/16" x 1/16" to 1/4" x 1/4" or thereabouts. Pills of uniform size and shape may also be formed by extrusion methods.

In this embodiment of the invention the platinum solution is preferably commingled with the alumina in the presence of ammonium hydroxide as it has been found that uniform distribution of the platinum throughout the alumina is obtained. The ammonium hydroxide may be commingled with the platinum solution and then added to the alumina, or the platinum solution or ammonium hydroxide solution may be first added to the alumina and then the other material added. In this embodiment, a particularly satisfactory method of commingling the platinum solution with the alumina is to suspend the alumina pills in the platinum-ammonium hydroxide solution and then to heat the mixture to evaporate the volatile material. In another embodiment the pills may be dipped in the solution, while still in another embodiment the solution may be percolated through the alumina pills.

After the platinum has been composited with the alumina, the halogen is then added to the catalyst. The halogen may be added in any suitable manner but should be added in a form which will readily react with the alumina and also one that will not leave undesired deposits in the catalysts. A preferred method of adding the halogen is in the form of an acid, such as hydrogen fluoride, hydrogen chloride, hydrogen bromide and/or hydrogen iodide. Hydrogen fluoride is preferably added as an aqueous solution for ease in handling and for control of the specific amount to be added. Another satisfactory source to be used for adding the halogen is the volatile salts, such as ammonium fluoride, ammonium chloride, etc. The ammonium ions will be removed during the subsequent heating of the catalyst and, therefore, will not leave undesirable deposits in the catalyst. In still another method, the halogen may be added as fluorine, chlorine, bromine, or iodine, but, in view of the fact that fluorine and bromine normally exist as gases, it is generally preferable to utilize them in the form of a solution for ease in handling. In some cases, the inclusion of certain components will not be harmful but may be beneficial, and in these cases the halogen may be added in the form of salts such as potassium fluoride, sodium fluoride, thorium fluoride, sodium chloride, potassium chloride, etc.

The concentration of halogen in the finished catalyst will be within the range of from about 0.1% to about 8% by weight of the alumina on a dry basis. The fluoride appears to be more active and therefore will be used within the range of from amout 0.1% to about 3% by weight of the alumina on a dry basis. The chloride will be used within the range of from about 0.2% to about 8% and preferably from about 0.5% to about 5% by weight of the alumina on a dry basis. In one embodiment, halogen may comprise a mixture of halogens such as a mixture of fluorine and chlorine. The total amount of halogens being within the range herein specified. It has been found that halogen concentrations below these lower limits do not give the desired improvement and, on the other hand, concentrations of halogen above the upper limits adversely affect the selectivity of the catalyst, thus catalyzing side reactions to an extent greater than desired.

The halogen may be added to the wet alumina-platinum mixture or it may be added after the alumina-platinum mixture has been calcined and formed into particles of either uniform or irregular size and shape. In the former instance, the final composite of alumina-platinum and halogen is dried, ground and calcined, or dried, ground, pilled and calcined in the manner hereinbefore set forth. In the latter instance, the alumina-platinum-halogen composite is dried and calcined as herein set forth.

After the alumina, platinum and halogen have been composited, the catalyst is dried at a temperature of from about 200° to 500° or more for a period of from about 2 to 24 hours or more and then preferably is calcined at a temperature of from about 700° to about 1100° F. for a period of from about 2 to 12 hours or more. The calcination is preferably effected in the presence of air or other oxygen containing gas. In another embodiment of the invention the calcination may comprise a two stage method in which it is first conducted in the presence of hydrogen and then followed by calcination in air, or the reverse procedure may be employed. In some cases the reduction with hydrogen or hydrogen containing gas may be effected with a lower temperature within the range of from about 300° to about 600° F.

In some cases the lubricant will be removed during the high temperature heating. In other cases as, for example, when graphite is used as the lubricant, the separate high temperature heating step may be omitted, and the effective heat treatment of the catalyst may be obtained in the plant before or during processing of the hydrocarbons.

Although the catalyst of the present invention will have a long life, it may be necessary to regenerate the catalyst after long periods of service. The regeneration may be effected by treatment with air or other oxygen-containing gas to burn carbonaceous deposits therefrom. In general, it is preferred to control the regeneration temperature not to exceed about 1100° F. In some cases it may be desirable to follow the burning operation with treatment with hydrogen-containing gas at temperatures of from about 700° to about 1100° F.

The improved catalyst of the present invention may be employed in any process for which platinum is a catalyst. The improved catalysts are particularly satisfactory for reforming operations in which a saturated gasoline, such as straight run gasoline, natural gasoline, etc., is subjected to conversion to produce a reformed gasoline of improved anti-knock properties. The saturated gasoline generally comprises a mixture of naphthenic and paraffinic hydrocarbons and the reforming operation effects dehydrogenation of the naphthenic hydrocarbons to aromatics, cyclization of the paraffinic hydrocarbons to aromatics, as well as to effect a controlled type of cracking which is selective both in quality and in quantity. In addition, other reactions may occur such as isomerization, hydrogen transfer, etc. The controlled or selective cracking is desirable because it further increases the octane number of the reformed gasoline, produces a gasoline of higher volatility and converts higher boiling fractions to lower boiling fractions within the range of gasoline. However, this cracking must be controlled because excessive cracking produces excessive normally gaseous products and also excessive carbonaceous deposits on and deactivation of the catalyst. The improved catalysts of the present invention are particularly desirable for reforming operations because the catalyst effects the desired aromatization and controlled cracking under selected conditions of operation.

It is understood that the gasoline may comprise a full boiling range gasoline or any selected fraction thereof, and reference to gasoline in the present specification and claims shall mean the full boiling gasoline or any selected fraction thereof.

The catalyst of the present invention may also find utility in treatment of higher boiling saturated fractions such as kerosene, gas oil, etc. In many cases it is desirable to produce from kerosene a highly aromatic product useful as a solvent, and the present invention is readily applicable for this purpose. The gasoline, kerosene, etc. fractions comprise a mixture of different hydrocarbons and, in accordance with the invention, the full boiling range fraction or any selected fraction thereof may be subjected to the desired conversion. When a selected fraction is so treated, it may be blended, all or in part, with the other fraction or fractions.

The catalyst of the present invention may prove particularly useful for destructive hydrogenation or hydrocracking reactions in which hydrocarbons and particularly oil heavier than gasoline is subjected to conversion to produce lower boiling products and particularly gasoline. For cracking reactions, it is prefered that the halogen content of the catalyst be within the upper limits of the range hereinbefore set forth because these higher halogen catalysts are more active for effecting decomposition reactions.

The catalyst of the present invention may also be useful for effecting hydrogenation reactions including the hydrogenation of unsaturated aliphatic hydrocarbons, such as mono-olefins, di-olefins, etc., to form the corresponding saturated hydrocarbons, hydrogenation of unsaturated cyclic hydrocarbons, hydrogenation of unsaturated alcohols, ketones, acids, etc. Other reactions in which these catalysts may find utility include oxidation as, for example, oxidation of olefins to form the corresponding oxide, such as the oxidation of ethylene to ethylene oxide, propylene oxide, etc., oxidation of alcohols, ketones, etc. These and other oxidation reactions are well known in the art, and it is within the scope of the present invention to effect these reactions in the presence of the novel catalysts. In reactions involving hydrogenation, oxidation or condensation, it is prefered that the halogen content of the catalyst be within the lower limits of the ranges hereinbefore specified in order to minimize side reactions.

As hereinbefore set forth, selected processing conditions are required depending upon the particular reaction desired. For reforming of straight run gasoline the temperature employed should be within the range of from about 600° to about 1000° F., the pressure within the range of from about 50 to about 1000 pounds per square inch, and the weight hourly spaced velocity within the range of from about 0.5 to about 10. For dehydrogenation of normal butane the temperature should be within the range of from about 800° to about 1025° F., the pressure from about atmospheric to about 50 pounds per square inch and the gaseous hourly space velocity from about 200 to about 5000. For hydrogenation reactions the temperature may range from atmospheric to about 500° F., the pressure from about 100 to about 3000 pounds or more, and the weight hourly space velocity from about 0.5 to 5. The weight hourly space velocity is defined as the weight of oil per hour per weight of catalyst in the reaction zone.

In one embodiment of the process, sufficient hydrogen will be produced in the reforming reaction to furnish the hydrogen required in the process and, therefore, it may be unnecessary to either introduce hydrogen from an extraneous source or to recycle hydrogen within the process. However, it usually will be preferred to introduce hydrogen from an extraneous source, generally at the beginning of the operation, and to recycle hydrogen within the process in order to be assured of a sufficient hydrogen atmosphere in the reaction zone. In some cases the gas to be recycled will contain hydrogen sulfide, introduced with the charge or liberated from the products, and it is within the scope of the present invention to treat the hydrogen containing gas to remove hydrogen sulfide or other impurities before recycling the hydrogen within the process.

The process of the present invention may be effected in any suitable equipment. A particularly suitable process comprises the well known fixed bed system in which the catalyst is disposed in a reaction zone and the hydrocarbons to be treated are passed therethrough in either upward or downward flow. The products are fractionated to separate hydrogen and to recover the desired products. As hereinbefore set forth, the hydrogen may be recycled for further use in the process. Other suitable units in which the process may be effected include the fluidized type process in which the hydrocarbons and catalysts are maintained in a state of turbulence under hindered settling conditions in a reaction zone, the compact moving bed type in which the catalyst and hydrocarbons are passed either concurrently or countercurrently to each other, the suspensoid type of operation in which the catalyst is carried into the reaction zone as a slurry in the hydrocarbon oil, and the fluidized fixed bed type of process in which the reaction is effected in substantially the same manner as described in the fluidized type process except that the catalyst does not leave the reaction zone.

The following example is introduced to further illustrate the novelty and utility of the present invention, but not with the intention of unduly limiting the same.

*Example*

581 grams of ammonium hydroxide diluted to 2000 ml. in water were added to 724 grams of aluminum chloride hexahydrate in 3000 ml. of distilled water. The resultant aluminum hydroxide was washed and filtered 6 times with water containing a small amount of ammonium hydroxide and was then washed and filtered with water. After the last wash, the aluminum hydroxide was slurried in sufficient water to make a thick slurry. A separate solution of chloroplatinic acid-hydrogen sulfide was formed and this colloidal solution was added to the slurry of aluminum hydroxide in an amount to form a final catalyst containing 0.3% by weight of platinum. The mixture was dried at a temperature of about 340° F. for 9 hours, ground and calcined at a temperature of 932° F. for 3 hours. Hydrogen fluoride solution was then added to the calcined material in an amount to form a final catalyst containing 0.75% by weight of fluorine. The composite was then dried on a water bath, sterotex was added as a lubricant, the composite was pilled, and the pills were calcined at a temperature of 932° F. for a period of 3 hours to burn out the sterotex and to calcine the catalyst.

The catalyst prepared in the above manner was used for the reforming of a Mid-Continent naphtha having an initial boiling point of 180° F., an end boiling point of 400° F. and an A. S. T. M. motor method octane number of 35. The reforming was effected at a catalyst temperature of about 850° F., a pressure of 500 pounds per square inch, a space velocity of 2, and a hydrogen to hydrocarbon ratio of 3 to 1. The run was continued for 3 days, and the volume percent of reformed gasoline for the 3 days averaged 93.1% and the A. S. T. M. motor method octane number for the 3 days averaged 78.5. The percent of aromatics in the reformed gasoline averaged about 44%.

I claim as my invention:

1. A method of manufacturing a catalyst which comprises commingling a solution of a platinum compound with alumina in an amount to form a final catalyst containing from about 0.01% to about 10% by weight of platinum, heating the resultant mixture at a temperature of from about 700° to about 1100° F., subsequently commingling with the alumina a halogen-containing solution in an amount to combine from about 0.1% to about 8% by weight of halogen with the alumina on a dry basis, and calcining the resultant composite at a temperature of from about 700° to about 1100° F.

2. A method of manufacturing a catalyst which comprises commingling ammonium hydroxide and a platinum-containing solution with calcined particles of precipitated alumina, said solution being in an amount to form a final catalyst containing from about 0.01% to about 10% by weight of platinum, subsequently commingling with the alumina a halogen-containing solution in an amount to combine from about 0.1% to about 8% by weight of halogen with the alumina on a dry basis, and calcining the resultant composite at a temperature of from about 700° to about 1100° F.

3. A method of preparing a catalyst which comprises precipitating alumina from aluminum chloride, calcining the alumina at a temperature of from about 800° to about 1200° F., commingling a chloroplatinic acid-ammonium hydroxide solution with the calcined alumina in an amount to form a final catalyst containing from about 0.01% to about 1% by weight of platinum, thereafter commingling aqueous hydrogen fluoride with the alumina in an amount to form a final catalyst containing from about 0.1% to about 3% of fluorine by weight of the alumina on a dry basis, and heating the resultant composite at a temperature of from about 700° to about 1100° F.

4. A method of preparing a catalyst which comprises precipitating alumina from aluminum chloride, commingling a chloroplatinic acid-hydrogen sulfide solution with the alumina in an amount to form a final catalyst containing from about 0.01% to about 1% by weight of platinum, heating the composite at a temperature of from about 700° to about 1100° F., thereafter commingling aqueous hydrogen fluoride with the alumina in an amount to form a final catalyst containing from about 0.1% to about 3% of fluorine by weight of the alumina on a dry basis, and heating the resultant composite to a temperature of from about 700° to about 1100° F.

5. A method of preparing a catalyst which comprises calcining precipitated alumina at a temperature of from about 800° to about 1200° F., commingling a chloroplatinic acid-ammonium hydroxide solution with the calcined alumina in an amount to form a final catalyst containing from about 0.01% to about 1% by weight of platinum, thereafter commingling aqueous hydrogen fluoride with the alumina in an amount to form a final catalyst containing from about 0.1% to about 3% of fluorine by weight of the alumina on a dry basis, and heating the resultant composite at a temperature of from about 700° to about 1100° F.

6. A method of preparing a catalyst which comprises commingling a chloroplatinic acid-hydrogen sulfide solution with precipitated alumina in an amount to form a final catalyst containing from about 0.01% to about 1% by weight of platinum, heating the composite at a temperature of from about 700° to about 1100° F., thereafter commingling aqueous hydrogen fluoride with the alumina in an amount to form a final catalyst containing from about 0.1% to about 3% of fluorine by weight of the alumina on a dry basis, and heating the resultant composite to a temperature of from about 700° to about 1100° F.

VLADIMIR HAENSEL.

REFERENCES CITED

The following references are of record in the file of this patent:

UNITED STATES PATENTS

| Number | Name | Date |
| --- | --- | --- |
| 2,005,412 | Connolly et al. | June 18, 1945 |
| 2,479,109 | Haensel | Aug. 16, 1949 |
| 2,479,110 | Haensel | Aug. 16, 1949 |